US008966113B2

(12) United States Patent
Vasseur et al.

(10) Patent No.: US 8,966,113 B2
(45) Date of Patent: Feb. 24, 2015

(54) TECHNIQUE FOR DYNAMICALLY RESTORING ORIGINAL TE-LSP ATTRIBUTES FOR INTERDOMAIN TE-LSPS

(75) Inventors: Jean-Philippe Vasseur, Dunstable, MA (US); Carol Iturralde, Framingham, MA (US); George Swallow, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 1963 days.

(21) Appl. No.: 11/368,160

(22) Filed: Mar. 3, 2006

(65) Prior Publication Data

US 2007/0208871 A1 Sep. 6, 2007

(51) Int. Cl.

| | |
|---|---|
| ***G06F 15/173*** | (2006.01) |
| ***H04L 12/723*** | (2013.01) |
| ***H04L 12/715*** | (2013.01) |
| *G06F 15/16* | (2006.01) |

(52) U.S. Cl.

CPC ................ *H04L 45/50* (2013.01); *H04L 45/04* (2013.01)

USPC ........................................... 709/238; 709/230

(58) Field of Classification Search

USPC .................................................. 709/230, 238

See application file for complete search history.

(56) References Cited

U.S. PATENT DOCUMENTS

| | | | | |
|---|---|---|---|---|
| 6,023,563 | A * | 2/2000 | Shani | 709/249 |
| 6,175,569 | B1 * | 1/2001 | Ellington et al. | 370/401 |
| 6,389,462 | B1 * | 5/2002 | Cohen et al. | 709/218 |
| 6,470,027 | B1 * | 10/2002 | Birrell, Jr. | 370/465 |
| 6,470,389 | B1 * | 10/2002 | Chung et al. | 709/227 |
| 6,493,317 | B1 | 12/2002 | Ma | |
| 6,560,654 | B1 * | 5/2003 | Fedyk et al. | 709/239 |
| 6,621,793 | B2 * | 9/2003 | Widegren et al. | 370/230.1 |
| 6,721,272 | B1 | 4/2004 | Parnafes | |
| 6,772,211 | B2 * | 8/2004 | Lu et al. | 709/226 |
| 6,778,494 | B1 * | 8/2004 | Mauger | 370/230 |
| 6,886,043 | B1 * | 4/2005 | Mauger et al. | 709/238 |
| 6,934,249 | B1 | 8/2005 | Bertin | |
| 7,139,838 | B1 * | 11/2006 | Squire et al. | 709/242 |
| 7,389,537 | B1 * | 6/2008 | Callon et al. | 726/22 |

(Continued)

OTHER PUBLICATIONS

Rekhter, Y., RFC 1771, entitled A Border Gateway Protocol 4 (BGP-4), Mar. 1995, pp. 1-54, IETF.*

(Continued)

*Primary Examiner* — Azizul Choudhury
*Assistant Examiner* — Tariq Najee-Ullah
(74) *Attorney, Agent, or Firm* — Novak Druce Connolly Bove + Quigg LLP

(57) ABSTRACT

A technique dynamically restores original attributes of a Traffic Engineering Label Switched Path (TE-LSP) that are provided in a source domain for a destination domain when traversing one or more intermediate domains that may translate the TE-LSP attributes in a computer network. According to the novel technique, a head-end node requests an interdomain TE-LSP having one or more original TE-LSP attributes (e.g., priority, bandwidth, etc.) using a signaling exchange. The head-end node may also request restoration of the original TE-LSP attributes upon entrance into the destination domain. Intermediate domains (e.g., border routers of the domains) receiving the request may translate the original TE-LSP attributes into corresponding intermediate domain TE-LSP attributes. When the request reaches the destination domain, the intermediate domain TE-LSP attributes of the requested TE-LSP are restored into the original TE-LSP attributes.

32 Claims, 9 Drawing Sheets

(56) References Cited

U.S. PATENT DOCUMENTS

| | | | | |
|---|---|---|---|---|
| 7,406,473 | B1 * | 7/2008 | Brassow et al. | 1/1 |
| 7,428,209 | B1 * | 9/2008 | Roberts | 370/217 |
| 7,468,984 | B1 * | 12/2008 | Croak et al. | 370/401 |
| 7,542,420 | B1 * | 6/2009 | Mokhtar et al. | 370/235 |
| 7,546,376 | B2 * | 6/2009 | Widegren et al. | 709/232 |
| 7,561,571 | B1 * | 7/2009 | Lovett et al. | 370/392 |
| 7,571,522 | B2 * | 8/2009 | Carnevali | 24/523 |
| 7,586,908 | B2 * | 9/2009 | Nelson et al. | 370/353 |
| 7,590,051 | B1 * | 9/2009 | Skalecki et al. | 370/218 |
| 8,365,018 | B2 * | 1/2013 | McIntosh et al. | 714/23 |
| 2001/0027490 | A1 * | 10/2001 | Fodor et al. | 709/238 |
| 2002/0023152 | A1 * | 2/2002 | Oguchi | 709/223 |
| 2002/0026503 | A1 * | 2/2002 | Bendinelli et al. | 709/220 |
| 2002/0026531 | A1 * | 2/2002 | Keane et al. | 709/250 |
| 2002/0036983 | A1 * | 3/2002 | Widegren et al. | 370/230.1 |
| 2002/0062379 | A1 * | 5/2002 | Widegren et al. | 709/227 |
| 2002/0068545 | A1 * | 6/2002 | Oyama et al. | 455/406 |
| 2002/0099937 | A1 * | 7/2002 | Tuomenoksa | 713/153 |
| 2002/0120749 | A1 * | 8/2002 | Widegren et al. | 709/227 |
| 2002/0188732 | A1 * | 12/2002 | Buckman et al. | 709/228 |
| 2003/0120135 | A1 * | 6/2003 | Gopinathan et al. | 600/300 |
| 2004/0260951 | A1 * | 12/2004 | Madour | 713/201 |
| 2005/0088977 | A1 * | 4/2005 | Roch et al. | 370/254 |
| 2005/0094567 | A1 * | 5/2005 | Kannan et al. | 370/241 |
| 2005/0117512 | A1 | 6/2005 | Vasseur | |
| 2005/0232285 | A1 * | 10/2005 | Terrell et al. | 370/401 |
| 2005/0281192 | A1 | 12/2005 | Nadeau | |
| 2005/0283823 | A1 * | 12/2005 | Okajo et al. | 726/1 |
| 2006/0039391 | A1 | 2/2006 | Vasseur | |
| 2007/0058567 | A1 * | 3/2007 | Harrington et al. | 370/254 |
| 2007/0133398 | A1 * | 6/2007 | Zhai | 370/228 |
| 2008/0232246 | A1 * | 9/2008 | Jiang | 370/225 |
| 2009/0013210 | A1 * | 1/2009 | McIntosh et al. | 714/4 |

OTHER PUBLICATIONS

Braden, R., et al., RFC 2205, entitled Resource Reservation Protocol—Version 1 Functional Specification, Sep. 1997, pp. 1-105, IETF.*

Zhang, R., et al., RFC 4216, entitled MPLS Inter-Autonomous System (AS) Traffic Engineering (TE) Requirements, Nov. 2005, pp. 1-28, IETF.

Mannie, E., RFC 3945, entitled Generalized Multi-Protocol Label Switching (GMPLS) Architecture, Oct. 2004, pp. 1-65, IETF.

Mannie, E., et al., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25, IETF.

Awduche, D., RFC 3209, entitled RSVP-TE: Extensions to RSVP for LSP Tunnels, Dec. 2001, pp. 1-57, IETF.

Smit, H., RFC 3784, entitled Intermediate System to Intermediate System (IS-IS) Extensions for Traffic Engineering (TE), Jun. 2004, pp. 1-13, IETF.

Katz, D., RFC 3630, entitled Traffic Engineering (TE) Extensions to OSPF Version 2, Sep. 2003, pp. 1-14, IETF.

Vasseur, J.P., et al., Internet Draft, entitled Path Computation Element (PCE) Communication Protocol (PCEP)—Version 1 (draft-vasseur-pce-pcep-02.txt), Sep. 2005, pp. 1-46, IETF.

Farrel, A., et al., Internet Draft, entitled Encoding of Attributes for Multiprotocol Label Switching (MPLS) Label Switched Path (LSP) Establishment Using RSVP-TE, May 2005, pp. 1-19, IETF.

Moy, J., RFC 2328, entitled OSPF Version 2, Apr. 1998, pp. 1-204, IETF.

Callon, R., RFC 1195, entitled Use of OSI IS-IS for Routing in TCP/IP and Dual Envrionments, Dec. 1990, pp. 1-80, IETF.

Berger, L., RFC 3473, entitled Generalized Multi-Protocol Label Switching (GMPLS) Signaling Resource Reservation Protocol-Traffic Engineering (RSVP-TE) Extensions, Jan. 2003, pp. 1-40, IETF.

* cited by examiner

TE-LSP ATTRIBUTE TRANSLATION MAP 400

| DOMAIN ID 405 | ATTRIBUTE 410 | RECEIVED VALUE 415 | TRANSLATED VALUE 420 |
|---|---|---|---|
| | | ⋮ | |
| AS 1 | PREEMPTION PRIORITY | 1 | 0 |
| AS 1 | PREEMPTION PRIORITY | 2-3 | 1 |
| AS 1 | PREEMPTION PRIORITY | 4-6 | 5 |
| AS 1 | CLASS TYPE | 1 | 2 |
| AS 1 | CLASS TYPE | 2 | 1 |
| | | ⋮ | |

ENTRIES 450

FIG. 4

TECHNIQUE FOR DYNAMICALLY RESTORING ORIGINAL TE-LSP ATTRIBUTES FOR INTERDOMAIN TE-LSPS

BACKGROUND OF THE INVENTION

1. Field of the Invention

The present invention relates to computer networks and more particularly to dynamically restoring original attributes of a Traffic Engineering Label Switched Path (TE-LSP) traversing one or more intermediate domains that may translate the TE-LSP attributes in a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS or an area is generally referred to as a "domain," and a router that interconnects different domains together is generally referred to as a "border router."

An example of an interdomain routing protocol is the Border Gateway Protocol version 4 (BGP), which performs routing between domains (ASes) by exchanging routing and reachability information among neighboring interdomain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol* 4 (*BGP*-4), published March 1995.

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version* 2, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address (e.g., stored in a header of the packet) may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Multi-Protocol Label Switching (MPLS) Traffic Engineering has been developed to meet data networking requirements such as guaranteed available bandwidth or fast restoration. MPLS Traffic Engineering exploits modem label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic*

*Engineering* (*TE*) dated June 2004, and RFC 3630, entitled *Traffic Engineering* (*TE*) *Extensions to OSPF Version* 2 dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints ("attributes") such as e.g., required bandwidth, "affinities" (administrative constraints to avoid or include certain links), etc. Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, potentially taking into consideration other path computation requests from other PCCs. It is important to note that when one PCE sends a request to another PCE, it acts as a PCC.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol* (*RSVP*), RFC 2205, the contents of which are hereby incorporated by reference in its entirety. In the case of traffic engineering applications, RSVP signaling (with Traffic Engineering extensions) is used to establish a TE-LSP and to convey various TE-LSP attributes to routers, such as border routers, along the TE-LSP obeying the set of required constraints whose path may have been computed by various means.

Often, TE-LSPs are established spanning multiple domains (e.g., ASes). An example of such an interdomain TE-LSP is where a head-end node and a tail-end node of the TE-LSP are in the same domain, but separated by one or more intermediate domains (e.g., a virtual point of presence, POP, as will be understood by those skilled in the art). Various requirements regarding interdomain TE-LSPs have been suggested in R. Zhang, et al., *MPLS Inter-Autonomous System* (*AS*) *Traffic Engineering* (*TE*) *Requirements*, RFC 4216, the contents of which are hereby incorporated by reference in its entirety. As mentioned therein, different domains (e.g., ASes, such as ASes of different ISPs) may use different schemes for TE-LSP attributes, e.g., bandwidth, preemption priorities, class types, protection flags, other affinities, etc. For instance, two adjacent domains may define different values for high priority traffic, e.g., voice traffic of the first domain may be defined as a class type "1" while the second domain may use a class type "2."

To respond accordingly to interdomain TE-LSP requests, border routers of the domains may be configured to translate the incoming requested attributes into the corresponding attributes of their domain. Translation maps may be used by the border routers to look up the appropriate value based on the previous domains identification (ID). For example, border routers of the second domain may be configured to translate incoming requests from the first domain with a preemption priority value of "1" to a preemption priority value of "0." Also, those skilled in the art will understand that a range of values may also be translated, such as, e.g., from "1-2" to "0."

One problem associated with this translation involves restoring the original TE-LSP attributes when entering a destination domain of the tail-end node, in particular where the destination domain is the same as the source domain of the head-end node. For instance, the destination domain may be unaware of whether any translation took place, and even so, may be unable to interpret translated ranges properly (e.g., "0" from "1 or 2"). Manual configuration of the TE-LSP attributes can be cumbersome and error prone, and in many situations impossible, e.g., during dynamic configuration/resizing of TE-LSPs, as will be understood by those skilled in the art. There remains a need, therefore, for efficiently restoring the original TE-LSP attributes for interdomain TE-LSPs.

SUMMARY OF THE INVENTION

The present invention is directed to a technique for dynamically restoring original attributes of a Traffic Engineering Label Switched Path (TE-LSP) that are provided in a source domain for a destination domain when traversing one or more intermediate domains that may translate the TE-LSP attributes in a computer network. According to the novel technique, a head-end node requests an interdomain TE-LSP having one or more original TE-LSP attributes (e.g., priority, bandwidth, etc.) using a signaling exchange. The head-end node may also request restoration of the original TE-LSP attributes upon entrance into the destination domain. Intermediate domains (e.g., border routers of the domains) receiving the request may translate the original TE-LSP attributes into corresponding intermediate domain TE-LSP attributes. When the request reaches the destination domain, the intermediate domain TE-LSP attributes of the requested TE-LSP are restored to the original TE-LSP attributes.

In the illustrative embodiment described herein, the request for restoration may be embodied as extensions to the signaling exchange, such as Resource ReSerVation Protocol (RSVP) TE signaling messages. Notably, the RSVP extensions are, in turn, embodied as new RSVP objects, flags, and/or type/length/value (TLV) encoded formats contained within the RSVP objects, such as, e.g., a novel Original-Attribute sub-object within an LSP-ATTRIBUTE object of the RSVP messages.

In accordance with one aspect of the present invention, the head-end node requests the establishment of the interdomain (e.g., inter-autonomous system) TE-LSP and also the restoration of the original TE-LSP attributes, e.g., by setting a novel flag within the LSP-ATTRIBUTE object. An entry border router of a first intermediate domain receives the request and determines an identification (ID) of the source domain and the corresponding original TE-LSP attributes. If there is a need to translate the attributes (e.g., due to interdomain non-matching attributes policy), the border router determines whether the head-end node requested restoration of the original TE-LSP attributes. If not, the border router simply translates the attributes into corresponding intermediate domain TE-LSP attributes. If so, however, the border router stores the original TE-LSP attributes in an object of the request (e.g., the novel Original-Attribute object of an RSVP Path message), along with the source domain ID (e.g., within a domain ID sub-object of the Original-Attribute object). The border router may then translate the attributes into corresponding intermediate domain TE-LSP attributes for its domain.

In accordance with another aspect of the present invention, when exiting an intermediate domain an exit border router determines if TE-LSP attribute restoration is required and whether the next domain is the same as the source domain (e.g., from the domain ID sub-object). If so, the original TE-LSP attributes are restored and the corresponding object (e.g., the Original-Attribute object) is removed from the request. Otherwise, the exit border router simply forwards the request to the next domain. Optionally, a flag may be included within the request to indicate that restoration was completed.

Alternatively, in accordance with yet another aspect of the present invention, when the entry border router receives the request for the interdomain TE-LSP, any translated TE-LSP attributes for the corresponding intermediate domain may be placed in an object of the request (e.g., a novel Extension Object of the LSP-ATTRIBUTE object), and the original TE-LSP attributes may be maintained within the request. As such, intermediate nodes within the intermediate domain establish the TE-LSP in response to the request according to the translated attributes of the Extension Object. In this manner, once the request reaches the exit border router, the exit border router may remove the extension object from the request, e.g., where the next domain is the source domain.

Advantageously, the novel technique dynamically restores original attributes of a TE-LSP that are provided in a source domain for a destination domain when traversing one or more intermediate domains that may translate the TE-LSP attributes in a computer network. By maintaining the original TE-LSP attributes within the request to establish the TE-LSP, the novel technique preserves those attributes for use at the destination domain after possible intermediate domain attribute translation. In particular, in many instances where the source and destination domain are the same domain (e.g., part of the same autonomous system), the novel technique ensures that the original TE-LSP attributes for that same domain may be restored and used. Also, the dynamic nature of the novel technique alleviates the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 4 is schematic block diagram of an exemplary TE-LSP attribute translation map that may be advantageously used with the present invention;

DETAILED DESCRIPTION OF AN ILLUSTRATIVE EMBODIMENT

Figure 1:
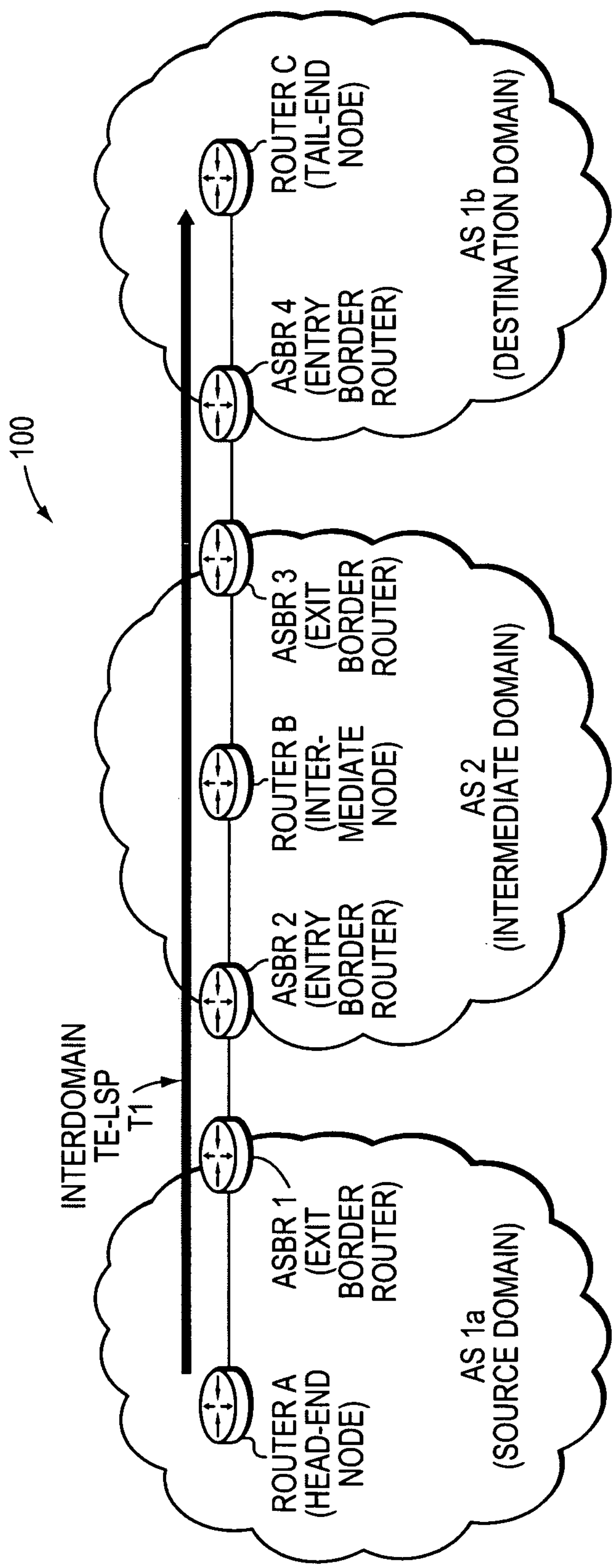
FIG. 1 is a schematic block diagram of an exemplary computer network that may be used in accordance with the present invention.

FIG. 1 is a schematic block diagram of an exemplary computer network 100 comprising domain AS2 (e.g., an Autonomous System), which interconnects a plurality of other domains, AS1*a* and AS1*b*, e.g., different portions of an AS1. An Autonomous System (AS) is herein defined to be a group of intermediate nodes, such as intradomain routers, within a network that are subject to a common authority and execute one or more intradomain routing protocols. Although each domain is illustratively an autonomous system, those skilled in the art will appreciate that the domains may alternatively be configured as routing domains or other networks or subnetworks. The domain AS1*a* includes intradomain routers such as border router ASBR1 through which communication, such as data packets, may pass into and out of the domain to border router ASBR2 of AS2. AS2 also includes border router ASBR3 in communication with border router ASBR4 of AS1*b*. Moreover, within AS1*a*, AS2, and AS1*b*, there are exemplary intradomain routers A, B, and C, respectively. Those skilled in the art will understand that any number of routers, nodes, links, etc., may be used in the computer network 100 and connected in a variety of ways, and that the view shown herein is for simplicity.

Data packets may be exchanged among the routers of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers within an AS using predetermined "interior" gateway protocols (IGPs), such as conventional distancevector protocols or, illustratively, link-state protocols, through the use of link-state advertisements (LSAs) or link-state packets. In addition, data packets containing network routing information may be exchanged among the autonomous systems using "external" or "exterior" gateway protocols, such as the Border Gateway Protocol (BGP).

Figure 2:
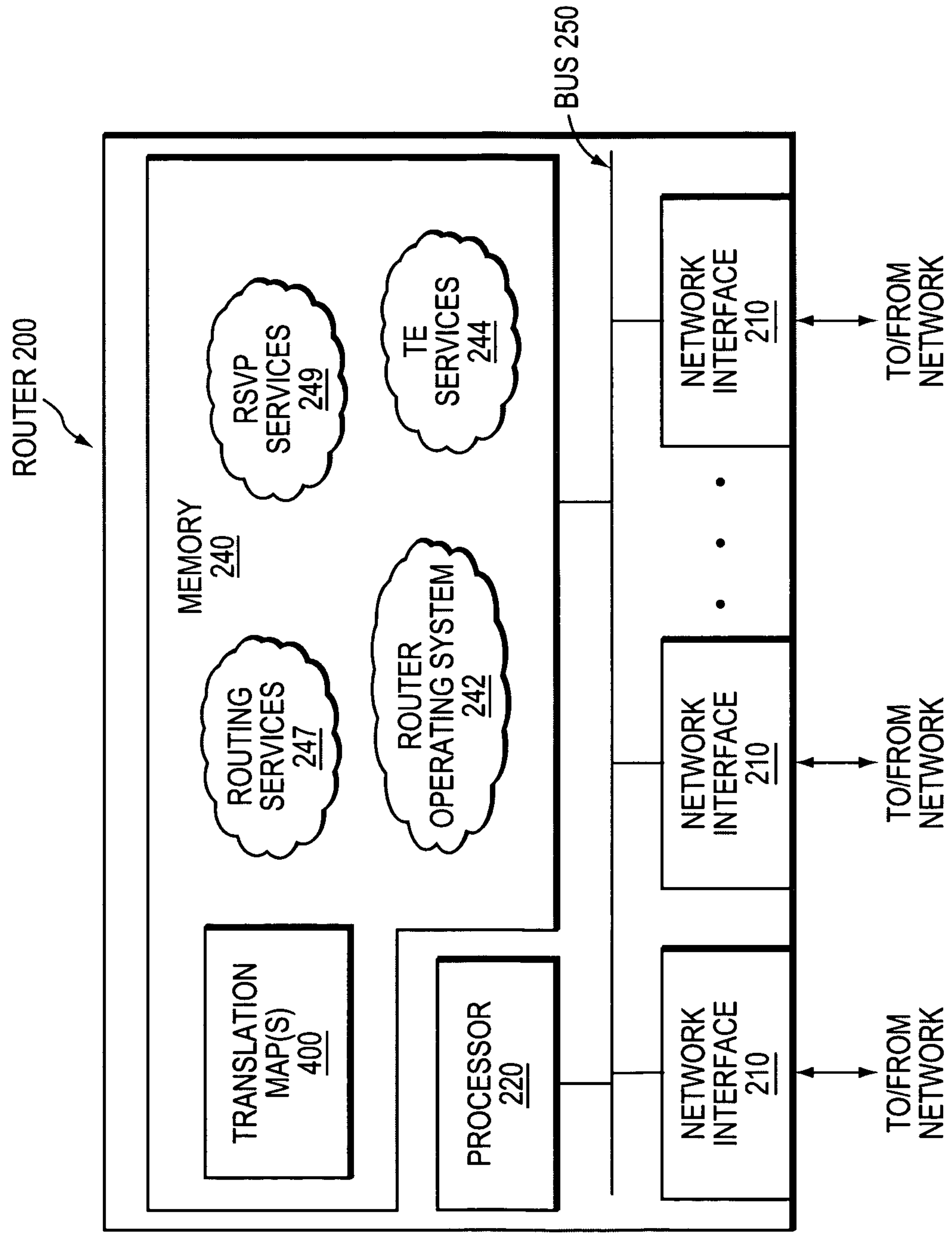
FIG. 2 is schematic block diagram of an exemplary router that may be advantageously used with the present invention.

FIG. 2 is a schematic block diagram of an exemplary router 200 that may be advantageously used with the present invention, e.g., as a head-end node, tail-end node, border router, intermediate router, etc. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as, e.g., translation maps 400. A router operating system 242 (e.g., the Internetworking Operating System, or IOS™, of Cisco Systems, Inc.), portions of which is typically resident in memory 240 and executed by the processor, functionally organizes the router by, inter alia, invoking network operations in support of software processes and/or services executing on the router. These software processes and/or services may comprise routing services 247, Traffic Engineering (TE) services 244, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP (e.g., OSPF and IS-IS), IP, BGP, etc. These functions may be configured to manage a forwarding information database (not shown) containing, e.g., data used to make forwarding decisions. Routing services 247 may also perform functions related to virtual routing protocols, such as maintaining VRF instances (not shown) as will be understood by those skilled in the art.

RSVP services 249 contain computer executable instructions for implementing RSVP and processing RSVP messages in accordance with the present invention. RSVP is described in RFC 2205, entitled *Resource ReSerVation Protocol* (*RSVP*), and in RFC 3209, entitled *RSVP-TE: Extensions to RSVP for LSP Tunnels*, both as incorporated above.

TE services 244 contain computer executable instructions for implementing TE functions in accordance with the present invention. Examples of Traffic Engineering are described in RFC 3209, RFC 3784, and RFC 3630 as incorporated above, and in RFC 3473, entitled, *Generalized Multi-Protocol Label Switching* (*GMPLS*) *Signaling Resource ReSerVation Protocol-Traffic Engineering* (*RSVP-TE*) *Extensions* dated January 2003, which is hereby incorporated by reference in its entirety. A TE database (TED, not shown) may be illustratively resident in memory 240 and used to store TE information provided by the routing protocols, such as IGP, BGP, and/or RSVP (with TE extensions, e.g., as described herein), including, inter alia, TE-LSP attribute information as described herein. The TED may be illustratively maintained and managed by TE services 244.

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress, a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. An example TE-LSP is shown as the thick line and arrow (T1) between a head-end node (router A) and a tail-end node (router C) in FIG. 1. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol (with Traffic Engineering extensions), and in particular, RSVP TE signaling messages. Notably, when incorporating the use of PCEs, the path computation request (and response) between PCC and PCE can be exchanged in accordance with a protocol specified in Vasseur, et al., *Path Computation Element* (*PCE*) *Communication Protocol* (*PCEP*)—*Version* 1—<*draft-ietf-pce-pcep*-02.*txt*>, Internet Draft, September 2005, the contents of which are hereby incorporated by reference in its entirety. It should be understood that the use of RSVP or PCEP serves only as an example, and that other communication protocols may be used in accordance with the present invention.

In accordance with RSVP, to request a data flow (TE-LSP) between a sender (head-end node) and a receiver (tail-end node), the sender may send an RSVP path request (Path) message downstream to the receiver along a path (e.g., a unicast route) to identify the sender and indicate e.g., bandwidth needed to accommodate the data flow, along with other attributes of the TE-LSP. The Path message may contain various information about the data flow including, e.g., traffic characteristics of the data flow. Also in accordance with the RSVP, a receiver establishes the TE-LSP between the sender and receiver by responding to the sender's Path message with a reservation request (Resv) message. The reservation request message travels upstream hop-by-hop along the flow from the receiver to the sender. The reservation request message contains information that is used by intermediate nodes along the flow to reserve resources for the data flow between the sender and the receiver, to confirm the attributes of the TE-LSP, and provide a TE-LSP label. If an intermediate node in the path between the sender and receiver acquires a Path message or Resv message for a new or established reservation (TE-LSP) and encounters an error (e.g., insufficient resources, failed network element, etc.), the intermediate node generates and forwards a path or reservation error (PathErr or ResvErr, hereinafter Error) message to the sender or receiver, respectively.

Figure 3:
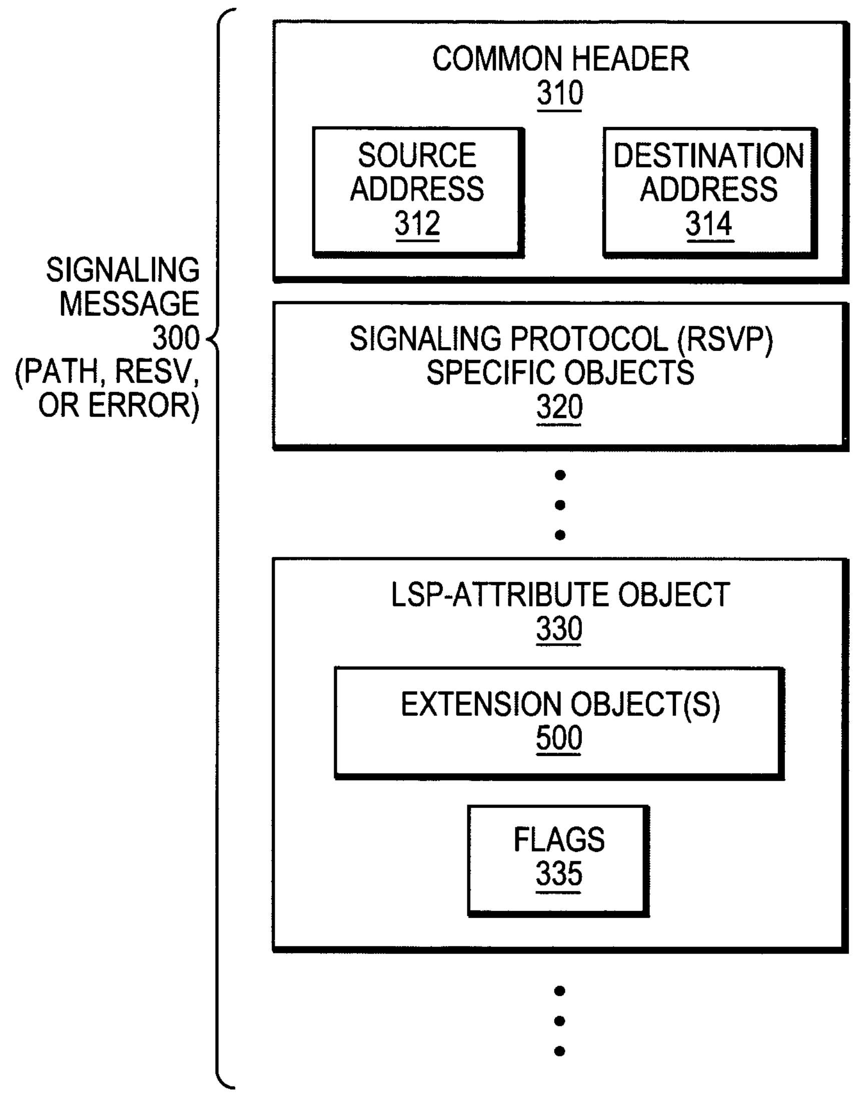
FIG. 3 is schematic block diagram of an exemplary signaling (RSVP) message that may be advantageously used with the present invention.

FIG. 3 is a schematic block diagram of portions of a signaling message 300 (e.g., RSVP message, such as Path, Resv or Error) that may be advantageously used with the present invention. Message 300 contains, inter alia, a common header 310 and one or more signaling protocol specific objects 320, such as an LSP-ATTRIBUTE object 330. The common header 310 may comprise a source address 312 and destination address 314, denoting the origination and requested termination of the message 300. Protocol specific objects 320 contain objects necessary for each type of message 300 (e.g., Path, Resv, Error, etc.). For instance, a Path message may have a sender template object, Tspec object, Previous-hop object, etc. The LSP-ATTRIBUTE object 330, for instance, may be used to signal attributes and/or information regarding an LSP (tunnel). To communicate this information, LSP-ATTRIBUTE object 330 (as well as specific objects 320) may include various type/length/value (TLV) encoding formats and/or flags, as will be understood by those skilled in the art.

An example of an LSP-ATTRIBUTE object is further described in Farrel, et al., *Encoding of Attributes for Multiprotocol Label Switching* (*MPLS*) *Label Switched Path* (*LSP*) *Establishment Using RSVP-TE* <*draft-ietf-mpls-rsvpte-attributes*-05.*txt*>, Internet Draft, May 2005, which is hereby incorporated by reference as though fully set forth herein. A Resv message, on the other hand, may have specific objects 320 for a label object, session object, filter spec object, etc., in addition to the LSP-ATTRIBUTE object 330. Error messages 300 (e.g., PathErr or ResvErr), may also have specific objects 320, such as for defining the type of error, etc.

It should be noted that in accordance with RSVP signaling, the state of the TE-LSP is refreshed on a timed interval, e.g., every thirty seconds, in which RSVP Path and Resv messages are exchanged. This timed interval is configurable by a system administrator. Moreover, various methods understood by those skilled in the art may be utilized to protect against route record objects (RROs) contained in signaling messages for a TE-LSP in the event security/privacy is desired. Such RRO filtering prevents a head-end node of the TE-LSP from learning of the nodes along the TE-LSP, i.e., nodes within the provider network.

As mentioned above, different domains may use different schemes for TE-LSP attributes, e.g., bandwidth, preemption priorities, class types, protection flags, other affinities, etc. To respond accordingly to interdomain TE-LSP requests, border routers of the domains may be configured to translate the incoming requested attributes into the corresponding attributes of their domain. Translation maps may be used by the border routers to determine (e.g., via a look up operation) the appropriate value based on the previous domain's identification (ID). FIG. 4 is schematic block diagram of an exemplary TE-LSP attribute translation map 400 that may be advantageously used with the present invention. Translation map 400 is illustratively stored in memory 240 and includes one or more entries 450, each comprising a plurality of fields for storing a domain ID 405, an attribute 410, a received value 415, and a translated value 420. The translation map 400 may be illustratively maintained and managed by TE services 244. To that end, the TE services 244 maintains predetermined translation definitions (e.g., provided by a system administrator) in order to translate requested TE-LSP attributes for the router's domain.

For example, assume that the translation map 400 is stored in a border router (ASBR2) of AS2. As such, the map may contain one or more entries 450 corresponding to TE-LSP requests received from AS1 in domain ID field 405. Those skilled in the art will understand that while only AS1 is shown in translation map 400, that other domain IDs may be contained within the same map 400, or within separate corresponding maps (not shown) accordingly. One or more entries 450 for AS1 may pertain to a preemption priority attribute 410. For instance, received values in field 415 for "1," "2-3," and "4-6" may correspond to translated values in field 420 of "0," "1," and "5," respectively. Also, a class type attribute 410 for class type values "1" and "2" (e.g., for voice and data) may be reversed, e.g., "2" and "1" respectively. Those skilled in the art will understand that while the translation map 400 is shown as a table, other formats (e.g., lists, etc.) may be used in accordance with the present invention. Those skilled in the art will also understand that the attributes, values, and translations shown are merely exemplary, and that any attributes, values, and/or translations may be used in accordance with the present invention.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching* (*GMPLS*) *Architecture*, dated October 2004, and RFC 3946, entitled *Generalized Multi-Protocol Label Switching* (*GMPLS*) *Extensions for Synchronous Optical Network* (*SONET*) *and Synchronous Digital Hierarchy* (*SDH*) *Control*, dated October 2004, the contents of both of which are hereby incorporated by reference in their entirety.

The present invention is directed to a technique for dynamically restoring original attributes of a TE-LSP that are provided in a source domain for a destination domain when traversing one or more intermediate domains that may translate the TE-LSP attributes in a computer network. According to the novel technique, a head-end node requests an interdomain TE-LSP having one or more original TE-LSP attributes (e.g., priority, bandwidth, etc.) using a signaling exchange. The head-end node may also request restoration of the original TE-LSP attributes upon entrance into the destination domain. Intermediate domains (e.g., border routers of the domains) receiving the request may translate the original TE-LSP attributes into corresponding intermediate domain TE-LSP attributes. When the request reaches the destination domain, the intermediate domain TE-LSP attributes of the requested TE-LSP are restored to the original TE-LSP attributes.

In the illustrative embodiment described herein, the request for restoration may be embodied as extensions to the signaling exchange, such as RSVP TE signaling messages. Notably, the RSVP extensions are, in turn, embodied as new RSVP objects, flags, and/or TLV encoded formats contained within the RSVP objects, such as, e.g., a novel Original-Attribute sub-object within an LSP-ATTRIBUTE object 330 of the RSVP messages 300.

The TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 5:
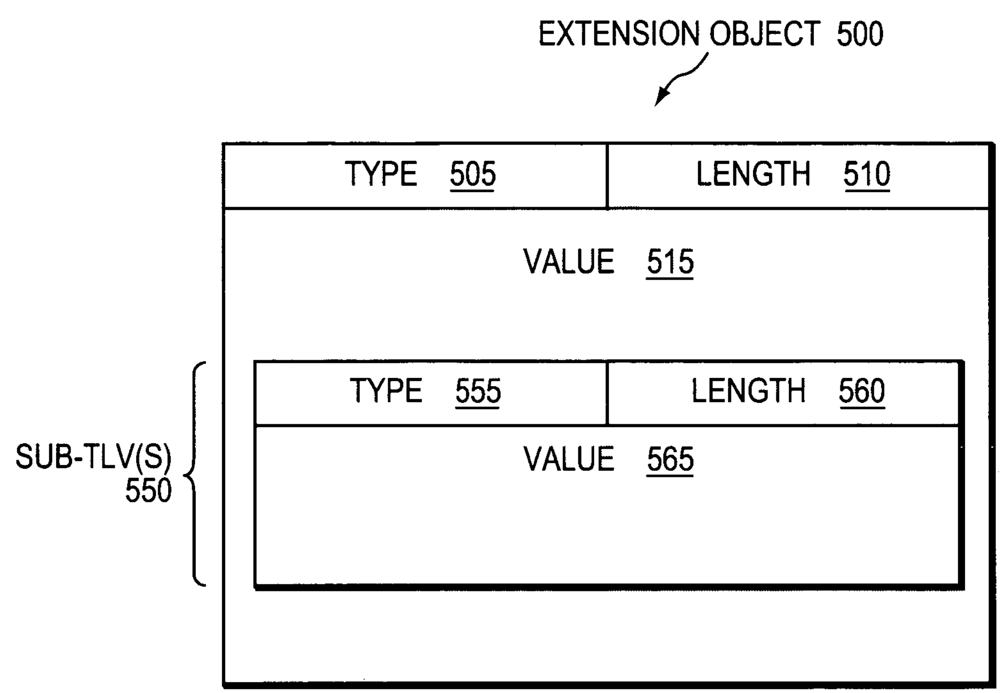
FIG. 5 is schematic block diagram of an exemplary extension (Original-Attribute) object that may be advantageously used with the present invention.

FIG. 5 is a schematic block diagram illustrating the format of an extension object (TLV) 500, such as an Original-Attribute object, that may be advantageously used with the present invention. The extension object (or sub-object) 500 is illustratively embodied as a TLV contained in an LSP-ATTRIBUTE object 330 of an RSVP message 300 and is extended to carry stored TE-LSP attribute information. To that end, the object 500 is organized to include a Type field 505 containing a predetermined type value signifying the specific content of the object 500. The Length field 510 is a variable length value. The TLV encoded format may also comprise one or more non-ordered sub-TLVs 550 carried within the TLV "payload" (e.g. Value field 515), each having a Type field 555, Length field 560, and Value field 565. The fields of the TLV 500 and sub-TLV(s) 550 are used in a variety of manners, including as described herein, according to the present invention.

In accordance with one aspect of the present invention, the head-end node (e.g., router A of source domain AS1) requests the establishment of the interdomain (e.g., inter-autonomous system) TE-LSP (e.g., T1) and also the restoration of the original TE-LSP attributes, e.g., by setting one of a plurality of novel flags 335 within the LSP-ATTRIBUTE object 330.

The request to establish the interdomain TE-LSP may include one or more TE-LSP attributes as described above (e.g., bandwidth, preemption priorities, class types, protection flags, other affinities, etc.) as will be understood by those skilled in the art. Illustratively, assume that an exemplary TE-LSP attribute for preemption priority of T1 is requested having a value of "1." The attributes may generally be contained within the LSP-ATTRIBUTE object 330 of the request (RSVP Path message) 300, as will also be understood by those skilled in the art. Notably, the request for restoration of original TE-LSP attributes may be either mandatory or optional, e.g., as signified by select flags 335 of the LSP-ATTRIBUTE object 330.

An entry border router (e.g., ASBR2) of a first intermediate domain (e.g., AS2) receives the request and determines an identification (ID) of the source domain (e.g., AS1, such as discovered from BGP look up operations, as will be understood) and the corresponding original TE-LSP attributes, such as contained within the LSP-ATTRIBUTE object 330. If there is a need to translate the attributes (e.g., due to interdomain non-matching attributes policy), the border router determines whether the head-end node requested restoration of the original TE-LSP attributes, e.g., by examining the flags 335. If no restoration has been requested, the border router may simply translate the received attributes into corresponding intermediate domain TE-LSP attributes. As described above, a translation map 400 may be used according to the source domain ID (405) and corresponding attribute (410) and received value (415). For instance, the illustratively received preemption priority value "1" from AS1 may be translated into a corresponding AS2 preemption priority value "0" according to the translation map 400.

On the other hand, if the head-end node has requested restoration (notably, or if the border router is configured to restore attributes regardless of explicit requests), and the border router (ASBR2) is the first entry border router, the border router stores the original TE-LSP attributes in an object of the request (e.g., the novel Original-Attribute object 500 of an RSVP Path message 300), along with the source domain ID (e.g., within a domain ID sub-object 550 of the Original-Attribute object 500). For example, ASBR2 stores the preemption priority attribute and value ("1") in the Original-Attribute object 500, e.g., within a sub-object 550 corresponding to preemption priority. Notably, each TE-LSP attribute may be stored within a specific corresponding sub-object 550, or otherwise signified within the Original-Attribute object 500, as will be understood by those skilled in the art. Also, the source domain ID may be stored within a source domain ID sub-object 550. Moreover, those skilled in the art will appreciate that the entry border router may determine whether it is the first entry border router (i.e., of a first intermediate domain) based on comparing the source domain ID to a domain ID of the previous domain from which the path message was received.

The border router may then translate the attributes into corresponding intermediate domain TE-LSP attributes for its domain, as mentioned above. These translated TE-LSP attributes (e.g., preemption priority "0") may replace the original TE-LSP attributes in the request, e.g., LSP-ATTRIBUTE object 330, for use by intermediate nodes (e.g., router B) of the corresponding intermediate domain. The entry border router may then forward the request (i.e., and translated TE-LSP attributes) into its domain. Notably, if the entry border router does not support the request for restoration, the border router may return an Error message to the head-end node, e.g., where the request is mandatory.

Figure 6:
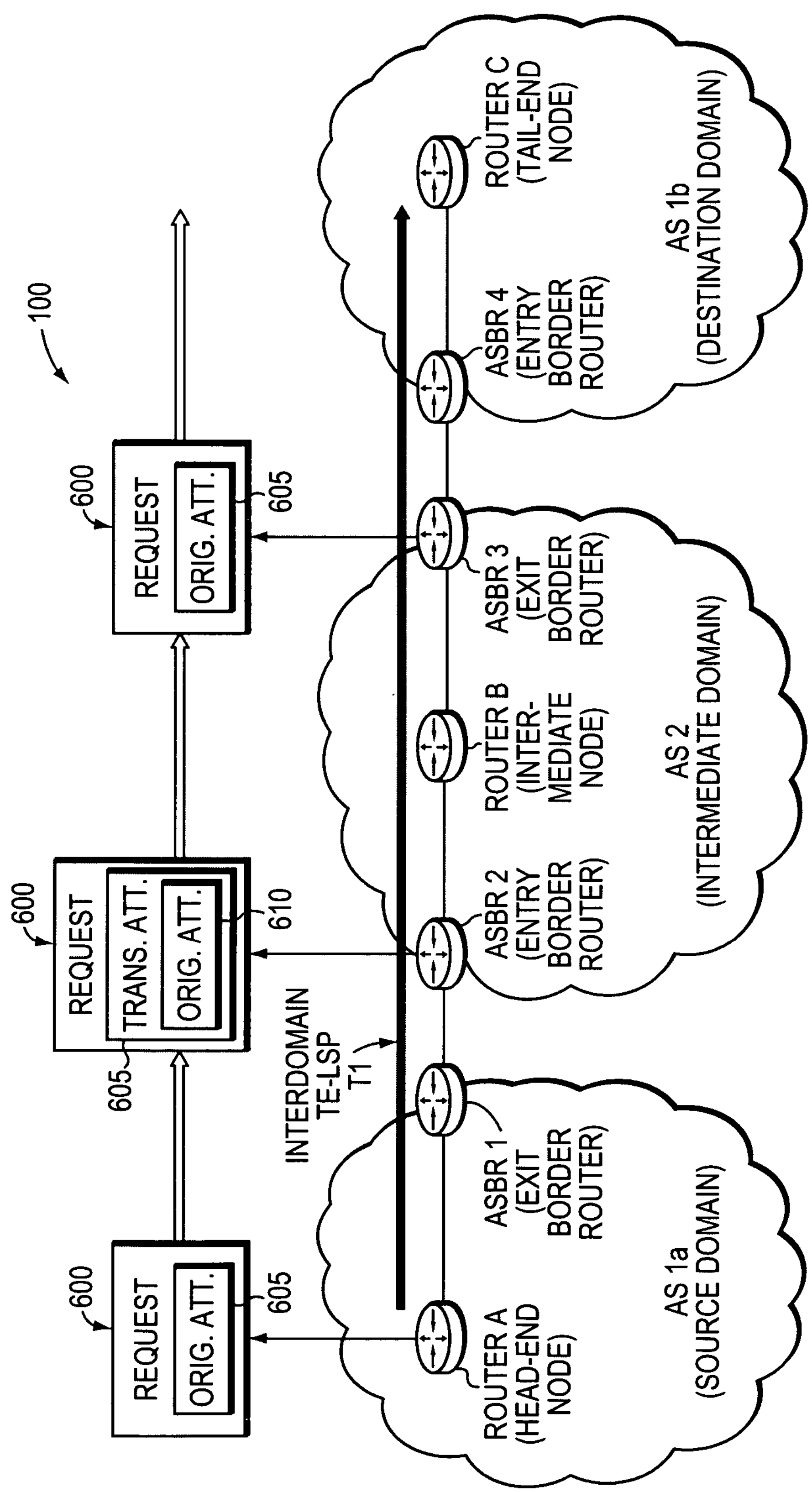
FIG. 6 is a schematic block diagram of the computer network in FIG. 1 showing a progression of a request (signaling message) in accordance with the present invention.

FIG. 6 is a schematic block diagram of the computer network 100 in FIG. 1 showing a progression of a request 600 (e.g., an RSVP Path message 300) in accordance with the present invention. The head-end node (router A) originates the request 600 to establish an interdomain TE-LSP and populates the TE-LSP attributes 605 with the original TE-LSP attributes (e.g., in LSP-ATTRIBUTE object 330). Upon receiving the request 600, in accordance with the technique described above, the entry border router (ASBR2) translates the attributes 605 and stores the original TE-LSP attributes in an object 610 of the request. Once the TE-LSP attributes have been translated and the original TE-LSP attributes stored, the entry border router may forward the request 600 to intermediate nodes (router B) of its domain (AS2).

In accordance with another aspect of the present invention, when exiting an intermediate domain (e.g., AS2) an exit border router (e.g., ASBR3) determines if TE-LSP attribute restoration is required and whether the next domain is the same as the source domain. For instance, the exit border examines the appropriate flag 335 of the LSP-ATTRIBUTE object 330 of the RSVP Path message 300 to determine whether restoration is required. If so, the exit border router further examines the Original-Attribute object 500 for the source domain ID (e.g., a domain ID sub-object 550) and determines whether the next domain is the same as the source domain. When restoration is requested and the next domain (i.e., the destination domain) is the same as the source domain, the exit border router restores the original TE-LSP attributes (from the Original-Attribute object 500) and the corresponding object 500 may be removed from the request. In this way, the destination domain is able to obtain the originally requested TE-LSP attributes. This is particularly useful, as described above, in the case where the destination domain is the same domain as the source domain, as will be understood by those skilled in the art.

As an example, ASBR3 may detect that restoration has been requested, and that the destination domain ID of the original TE-LSP attributes corresponds to AS1. Since the next domain adjacent to ASBR3 is AS1 and the destination domain ID equals the source domain ID, ASBR3 restores the original TE-LSP attributes. Illustratively, the translated TE-LSP attribute for preemption priority (e.g., "0" of AS2) may be restored to the original preemption priority stored within the original-attribute object 500 (e.g., "1" of AS1) within the request (e.g., within the LSP-ATTRIBUTE object 330).

Optionally, one of a plurality of novel flags 335 may be included within the request (e.g., within LSP-ATTRIBUTE object 330) to indicate that restoration was completed. This way, the entry border router of the destination domain (e.g., ASBR4 of AS1) may be able to confirm whether restoration has been completed according to the request. If the flag is not set in the destination domain, the entry border router of the destination domain may attempt to restore the original TE-LSP attributes by examining the contents of the original-attribute object 500 (if one exists), or by translating the received TE-LSP attributes from the intermediate domain. One concern, however, is that the TE-LSP attributes may not have been translated from the original TE-LSP attributes, so the translation into the destination domain may be improper. In this case, those skilled in the art will understand that it may be beneficial to simply return an error when the completed restoration flag 335 is not set upon receipt of the request at the entry border router of the destination domain.

In the event that either restoration is not requested or the next domain is not the same as the source domain, the exit border router may simply forward the request to the next domain (e.g., the destination domain or the next intermediate domain, respectively). For instance, if the next domain were not AS1, e.g., where an AS3 (not shown) existed between AS2 and AS1 (i.e., AS1*b*), then ASBR3 would forward the request to the next intermediate domain (AS3). Those skilled in the art will appreciate that border routers of next intermediate domains may be configured to translate attribute values for their respective domains based on the previously translated TE-LSP attributes or on the original TE-LSP attributes stored within the request. For instance, each domain may only have translation maps to adjacent domains, in which case translation of the original TE-LSP attributes may not be possible. In such situations, the stored original TE-LSP attributes in the request may remain unmodified.

Referring again to FIG. 6, upon receiving the request 600 at the exit of the intermediate domain (AS2), the exit border router (ASBR3) may determine that restoration was requested and that the next domain is the same as the source domain, as described above. Accordingly, the exit border router may restore the TE-LSP attribute 605 to the original TE-LSP attributes stored within the object 610, and may remove the object 610 from the request 600. The border router may then forward the request 600 to the next domain, i.e., the destination domain (entry border router ASBR4 of the destination domain AS1).

Figure 7:
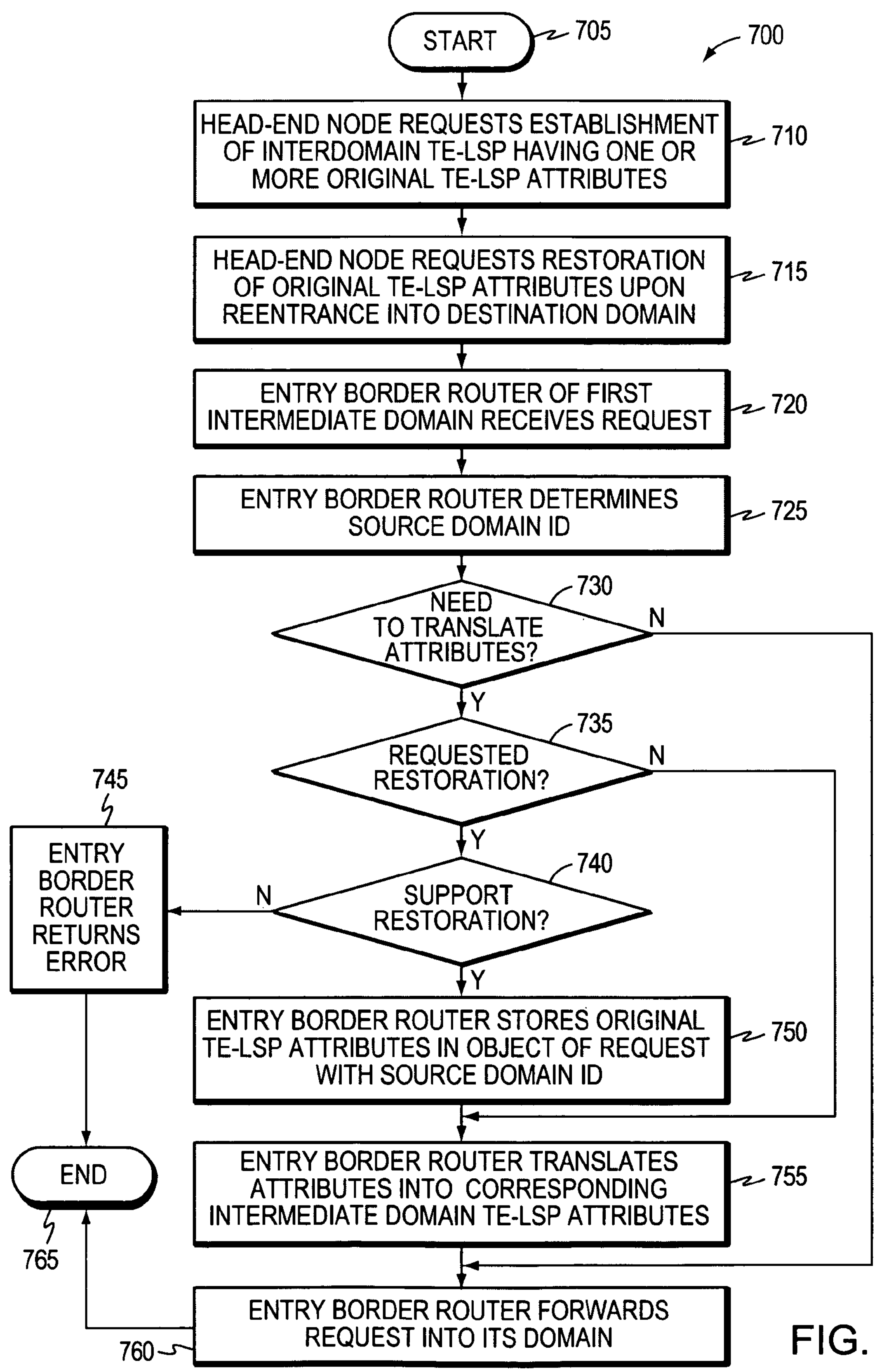
FIG. 7 is a flowchart illustrating a procedure for dynamically maintaining original attributes of a TE-LSP in accordance with the present invention.

FIG. 7 is a flowchart illustrating a procedure for dynamically maintaining original attributes of a TE-LSP in accordance with the present invention. The procedure 700 starts at step 705, and continues to step 710, where the head-end node (e.g., router A of source domain AS1) requests the establishment of an interdomain TE-LSP (e.g., T1) having one or more original TE-LSP attributes. In step 715, the head-end node also requests (e.g., within the same request) the restoration of the original TE-LSP attributes upon entrance into the destination domain of the TE-LSP (e.g., AS1). An entry border router (e.g., ASBR2) of a first intermediate domain (e.g., AS2) receives the request in step 720, and determines the source domain ID (e.g., AS1) in step 725. If there is a need to translate the attributes in step 730, e.g., in response to non-matching attribute policies with the source domain, the entry border router determines whether restoration of the original TE-LSP attributes has been requested in step 735 (e.g., by examining a flag 335 of the request 300). Notably, if the entry border router does not support restoration in step 740 (e.g., where the request for restoration is mandatory, as described above), the entry border router may return an error in step 745, and the procedure 700 ends at step 765.

If restoration is supported in step 740, the entry border router stores the received original TE-LSP attributes in an object of the request (e.g., the original-attribute object 500 within an LSP-ATTRIBUTE object 330 of an RSVP Path message 300) in step 750. Also, the source domain ID (e.g., AS1) may be stored within the object, such as a designated sub-object 550 as described above. In step 755, the entry border router translates the received original TE-LSP attributes into corresponding intermediate domain TE-LSP attributes (e.g., using a translation map 400), both in response to storing the original TE-LSP attributes in step 750, or in response to not requiring restoration in step 735 above. Once the TE-LSP attributes have been translated in step 755 (or if the attributes did not need translation in step 730 above), the entry border router forwards the request into its corresponding domain in step 760 for processing by zero or more intermediate nodes (e.g., router B). The procedure 700 then ends in step 765.

Figure 8:
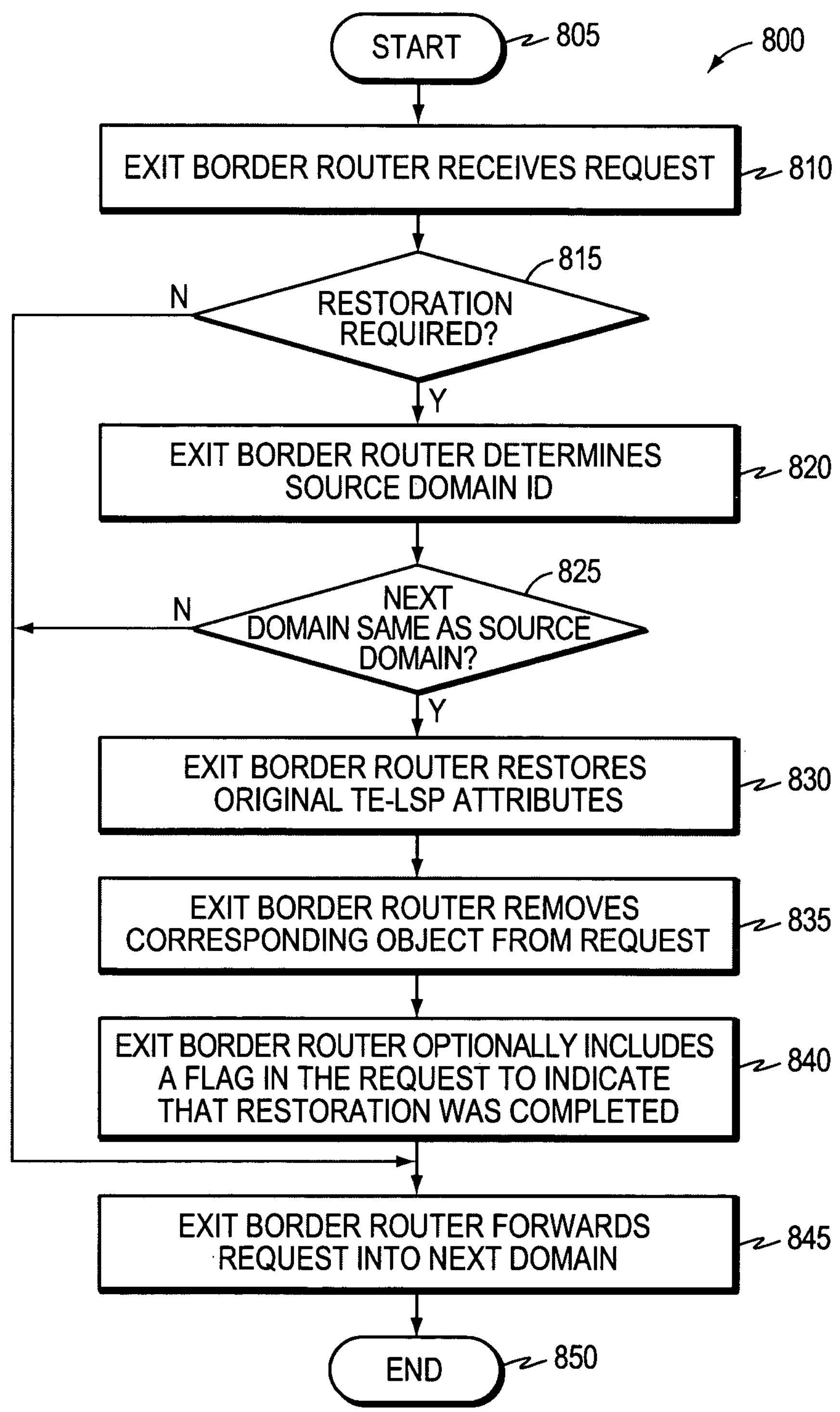
FIG. 8 is a flowchart illustrating a procedure for dynamically restoring original attributes of a TE-LSP in accordance with the present invention.

FIG. 8 is a flowchart illustrating a procedure for dynamically restoring original attributes of a TE-LSP in accordance with the present invention. The procedure 800 starts at step 805 (e.g., continuing from procedure 700), and continues to step 810, where the exit border router (e.g., ASBR3) of the intermediate domain (e.g., AS2) receives the request. If restoration of the original TE-LSP attributes is required in step 815 (e.g., determined by examining flag 335), the exit border router determines the source domain ID in step 820, e.g., by examining a corresponding sub-object 550 of the request. If the next domain is the same as the source domain (e.g., AS1) in step 825, the exit border router restores the original TE-LSP attributes as found within the object of the request (e.g., original-attribute object 500). The exit border router may then remove the object 500 from the request in step 835, and optionally includes a flag in the request to indicate that restoration was completed in step 840 as described above. Once the original TE-LSP attributes have been restored, or if restoration was not required in step 815 above, or if the restoration was required, but the next domain is not the same as the source domain in step 825 above, the exit border router forwards the request into the next domain (e.g., the destination or next intermediate domain, as described above) in step 845. The procedure 800 then ends at step 850.

Alternatively, in accordance with yet another aspect of the present invention, when the entry border router receives the request for the interdomain TE-LSP, any translated TE-LSP attributes for the corresponding intermediate domain may be placed in an object of the request (e.g., the novel Extension Object 500 of the LSP-ATTRIBUTE object 330), and the original TE-LSP attributes may be maintained within the request. As such, intermediate nodes (e.g., router B) within the intermediate domain (e.g., AS2) establish the TE-LSP in response to the request according to the translated attributes of the Extension Object 500. In this manner, once the request reaches the exit border router (e.g., ASBR3), the exit border router may remove the extension object 500 from the request, e.g., where the next domain is the same as the source domain, i.e., the destination domain, as described above, thus "restoring" the original TE-LSP attributes. Notably, as described above, multiple intermediate domains may exist between the source and destination domains. Because of this, it may be beneficial to keep the extension object 500 with the translated TE-LSP attributes between intermediate domains. For instance, the border routers between intermediate domains may then re-translate the extended object 500, and not be required to maintain translation maps 400 for non-adjacent domains, as mentioned above. Those skilled in the art will understand that this alternative aspect may require configuration and cooperation of all intermediate nodes along the TE-LSP, while the above aspects may only require that of the border routers.

Figure 9:
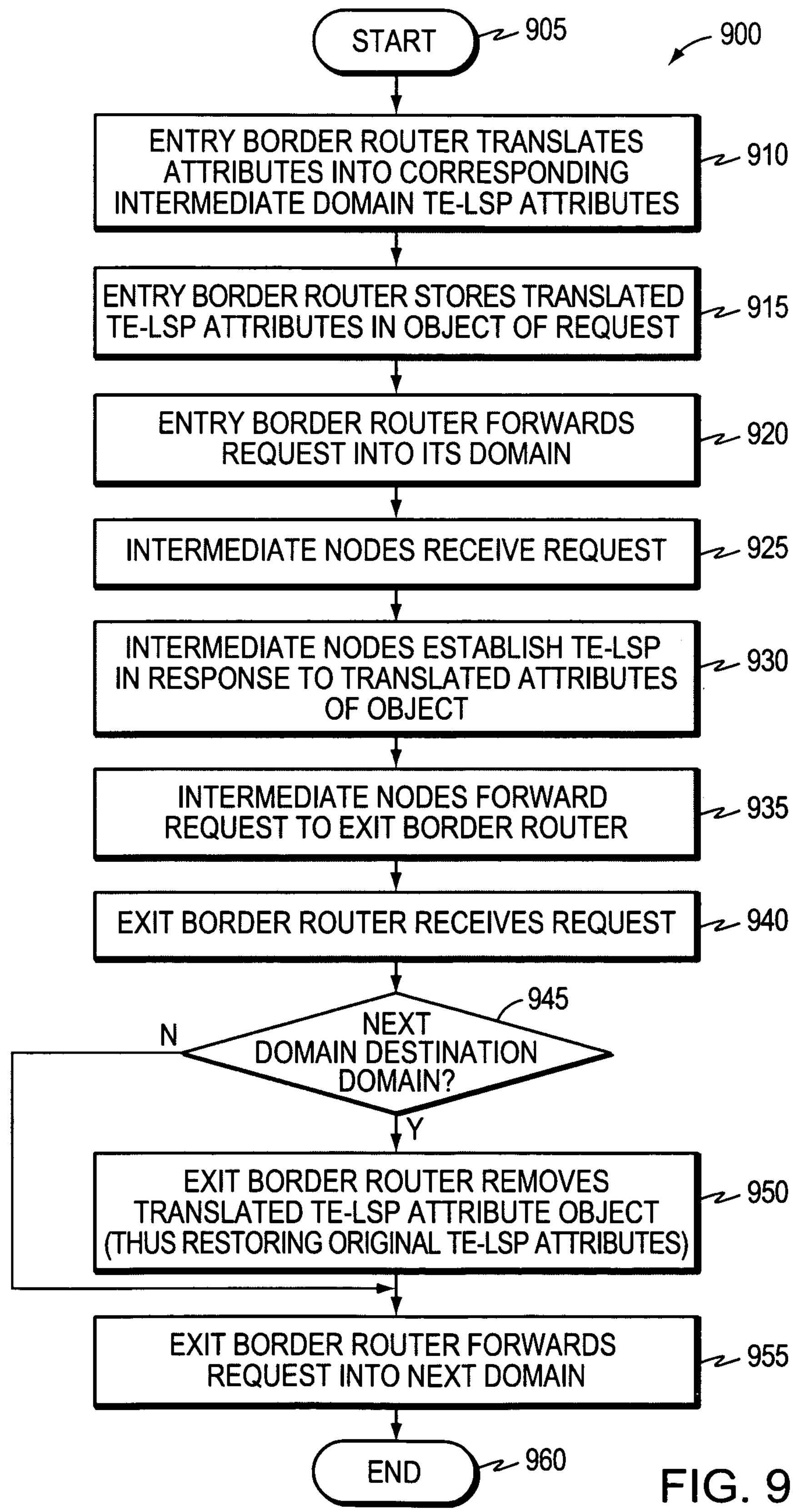
FIG. 9 is a flowchart illustrating an alternative procedure for dynamically maintaining and restoring original attributes of a TE-LSP in accordance with the present invention.

FIG. 9 is a flowchart illustrating an alternative procedure for dynamically maintaining and restoring original attributes of a TE-LSP in accordance with the present invention. The procedure 900 starts at step 905 (e.g., continuing from step 740 of procedure 700 in FIG. 7), and continues to step 910, where the entry border router translates the received original TE-LSP attributes into corresponding intermediate domain TE-LSP attributes (e.g., using a translation map 400). At step 915, the entry border router stores the translated TE-LSP attributes in an object of the request (e.g., the extension object 500 within an LSP-ATTRIBUTE object 330 of an RSVP Path message 300). The entry border router may then forward the request into its corresponding domain in step 920 to one or more intermediate nodes (e.g., router B), which receive the request in step 925. The intermediate nodes establish the requested TE-LSP (as will be understood by those skilled in the art) in response to the translated TE-LSP attributes of the extension object 500 in step 930, and forward the request to the exit border router (e.g., ASBR3) in step 935. Once the exit border router receives the request in step 940, and if the next domain is the same as the source domain in step 945 (as described above), the exit border router removes the translated TE-LSP attribute object in step 950, thus "restoring" the original TE-LSP attributes for entry ("reentry") into the source domain (e.g., AS1). Once the original TE-LSP attributes have been restored, or if next domain is not the same as the source domain in step 945 above, the exit border router forwards the request into the next domain (e.g., the destination or next intermediate domain) in step 955. The procedure 900 then ends at step 960.

Advantageously, the novel technique dynamically restores original attributes of a TE-LSP that are provided in a source domain for a destination domain when traversing one or more intermediate domains that may translate the TE-LSP attributes in a computer network. By maintaining the original TE-LSP attributes within the request to establish the TE-LSP, the novel technique preserves those attributes for use at the destination domain after possible intermediate domain attribute translation. In particular, in many instances where the source and destination domain are the same domain (e.g., part of the same autonomous system), the novel technique ensures that the original TE-LSP attributes for that same domain may be restored and used. Also, the dynamic nature of the novel technique alleviates the need for cumbersome manual configuration.

While there has been shown and described an illustrative embodiment that dynamically restores original attributes of a TE-LSP that are provided in a source domain for a destination domain when traversing one or more intermediate domains that may translate the TE-LSP attributes in a computer network, it is to be understood that various other adaptations and modifications may be made within the spirit and scope of the present invention. For example, the invention has been shown and described herein using RSVP as the signaling exchange for the request. However, the invention in its broader sense is not so limited, and may, in fact, be used with other signaling exchanges as will be understood by those skilled in the art. Moreover, while the above description describes performing the technique at the head-end node and border routers, the invention may also be advantageously used with PCEs. In addition, while one example of a tunnel is an MPLS TE-LSP, other known tunneling methods include, inter alia, the Layer Two Tunnel Protocol (L2TP), the Point-to-Point Tunneling Protocol (PPTP), and IP tunnels. Also, while the above description describes TE-LSP attributes as being stored within the LSP-ATTRIBUTE object 330 of an RSVP message 300, those skilled in the art will understand that certain attributes (e.g., bandwidth) may actually be stored within a SESSION-ATTRIBUTE object (not shown) of the message 300, such as described in above-incorporated RFC 3209, and such object may be used in accordance with the present invention.

Further, the invention has been shown and described herein for restoring original TE-LSP attributes upon entry (reentry) into the destination domain that is the same as the source domain. However, the invention in its broader sense is not so limited, and may, in fact, be used to restore original TE-LSP attributes provided by the source domain when entering a destination domain that is not the same as the source domain. For instance, the source domain ID may be stored within a source domain ID sub-object 550, as described above, while a destination domain ID may be stored within a separate destination domain ID sub-object 550. In this way, for entering a domain matching the destination domain ID, the exit border router may restore the original TE-LSP attributes provided by the source domain accordingly.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:

requesting, in a request, an interdomain Traffic Engineering Label Switched Path (TE-LSP) between a source domain and a destination domain, the request containing an original TE-LSP attribute for the interdomain TE-LSP, wherein the original TE-LSP attribute is provided at the source domain, and wherein the interdomain TE-LSP is an end-to-end tunnel configured to guarantee a predetermined level of quality of service and traverse one or more intermediate domains that are configured to translate original TE-LSP attributes into intermediate domain TE-LSP attributes;

requesting, in the request, restoration of the original TE-LSP attribute upon entrance into the destination domain;

receiving the request at an intermediate domain;

translating the original TE-LSP attribute at the intermediate domain into an intermediate domain TE-LSP attribute using a translation map; and restoring the intermediate domain TE-LSP attribute into the original TE-LSP attribute when the request reaches the destination domain.

2. The method as in claim 1, wherein the original TE-LSP attribute is translated in response to the requesting restoration.

3. The method as in claim 1, wherein the original TE-LSP attribute is translated in response to configuration of an entry border router receiving the request in the intermediate domain.

4. The method as in claim 1, further comprising:

storing the original TE-LSP attribute in an object of the request.

5. The method as in claim 4, further comprising:

storing each of a plurality of original TE-LSP attributes in a separate sub-object of the object.

6. The method as in claim 4, further comprising:

storing a source domain identification in the object.

7. The method as in claim 4, further comprising:

removing the object when restoring the original TE-LSP attribute into the request.

8. The method as in claim 1, further comprising:

wherein the request is a signaling exchange.

9. The method as in claim 8, wherein the signaling exchange is embodied as a resource reservation protocol signaling message.

10. The method as in claim 9, further comprising:

storing the original TE-LSP attribute in an extended sub-object of an LSP-ATTRIBUTE object of the resource reservation protocol signaling message.

11. The method as in claim 1, wherein the restoration of the original TE-LSP attribute is requested by setting a corresponding flag in the request.

12. The method as in claim 1, wherein the restoration of the original TE-LSP attribute is requested as one of a mandatory request or an optional request.

13. The method as in claim 12, further comprising:

in response to the mandatory request, returning an error message from a border router of the intermediate domain to the source domain in the event the border router does not support requesting restoration.

14. The method as in claim 1, wherein the source domain and the destination domain are a same domain.

15. The method as in claim 1, further comprising:

in response to restoration of the original TE-LSP attribute, including a flag in the request, the flag indicating that the restoration was completed.

16. The method as in claim 1, wherein the original TE-LSP attribute is translated at an entry border router of the intermediate domain.

17. The method as in claim 1, wherein the intermediate domain TE-LSP attribute is restored at an exit border router of the intermediate domain.

18. The method as in claim 1, wherein the translation map comprises one of a domain identifier, a TE-LSP attribute, a received value, or a translated value.

19. The method as in claim 1, further comprising:

storing the intermediate domain TE-LSP attribute in an object of the request.

20. The method as in claim 19, further comprising:

receiving the request having the object at an intermediate node of the intermediate domain; and establishing the interdomain TE-LSP at the intermediate node according to the intermediate domain TE-LSP attribute within the object.

21. The method as in claim 19, wherein the intermediate domain TE-LSP attribute is restored by removing the object.

22. An apparatus comprising:

means for requesting, in a request, an interdomain Traffic Engineering Label Switched Path (TE-LSP) between a source domain and a destination domain, the request containing an original TE-LSP attribute for the interdomain TE-LSP, wherein the original TE-LSP attribute is provided at the source domain, and wherein the interdomain TE-LSP is an end-to-end tunnel configured to guarantee a predetermined level of quality of service and traverse one or more intermediate domains that are configured to translate original TE-LSP attributes into intermediate domain TE-LSP attributes;

means for requesting, in the request, restoration of the original TE-LSP attribute upon entrance into the destination domain;

means for receiving the request at an intermediate domain;

means for translating the original TE-LSP attribute at the intermediate domain into an intermediate domain TE-LSP attribute using a translation map; and means for restoring the intermediate domain TE-LSP attribute into the original TE-LSP attribute when the request reaches the destination domain.

23. A non-transitory computer-readable medium storing instructions which, when executed by a processor, cause the processor to perform operations comprising:

requesting, in a request, an interdomain Traffic Engineering Label Switched Path (TE-LSP) between a source domain and a destination domain, the request containing an original TE-LSP attributes for the interdomain TE-LSP, wherein the original TE-LSP attribute is provided at the source domain, and wherein the interdomain TE-LSP is an end-to-end tunnel configured to guarantee a predetermined level of quality of service and traverse one or more intermediate domains that are configured to translate original TE-LSP attributes into intermediate domain TE-LSP attributes;

requesting, in the request, restoration of the original TE-LSP attribute upon entrance into the destination domain;

receiving the request at an intermediate domain;

translating the original TE-LSP attribute at the intermediate domain into an intermediate domain TE-LSP attribute using a translation map; and restoring the intermediate domain TE-LSP attribute into the original TE-LSP attribute when the request reaches the destination domain.

24. A system comprising:

a head-end node of a source domain configured to request, in a request, i) an interdomain Traffic Engineering Label Switched Path (TE-LSP) between the source domain and a destination domain, and ii) restoration of the original TE-LSP attributes upon entrance into the destination domain, wherein the request contains an original TE-LSP attribute for the interdomain TE-LSP, wherein the original TE-LSP attribute is provided at the source domain, and wherein the interdomain TE-LSP is an end-to-end tunnel configured to guarantee a predetermined level of quality of service and traverse one or more intermediate domains that are configured to translate original TE-LSP attributes into intermediate domain TE-LSP attributes;

an entry border router of a first intermediate domain, the entry border router being configured to i) receive the request, and ii) translate the original TE-LSP attribute into an intermediate domain TE-LSP attribute using a translation; and an exit border router of a second intermediate domain, the exit border router being configured to i) restore the intermediate domain TE-LSP attribute into the original TE-LSP attribute, and ii) forward the request to the destination domain.

25. A head-end node of a source domain, the head-end node comprising:

one or more network interfaces;

a processor coupled to the one or more network interfaces and adapted to execute software processes; and a memory adapted to store a process executable by the processor, the process configured to:

request, in a request, an interdomain Traffic Engineering Label Switched Path (TE-LSP) between the source domain and a destination domain, the request containing an original TE-LSP attribute for the interdomain TE-LSP, wherein the original TE-LSP attribute is provided at the source domain, and wherein the interdomain TE-LSP is an end-to-end tunnel configured to guarantee a predetermined level of quality of service and traverse one or more intermediate domains that are configured to translate original TE-LSP attributes into intermediate domain TE-LSP attributes using a translation map; and request, in the request, restoration of the original TE-LSP attribute upon entrance into the destination domain by inclusion of a flag in the request that indicates a desire for the restoration.

26. An entry border router of an intermediate domain, the entry border router comprising:

one or more network interfaces;

a processor coupled to the one or more network interfaces and adapted to execute software processes; and a memory adapted to store a process executable by the processor, the process configured to:

receive a request requesting i) an interdomain Traffic Engineering Label Switched Path (TE-LSP) between a source domain and a destination domain, the request containing an original TE-LSP attribute for the interdomain TE-LSP, and ii) restoration of the original TE-LSP attributes upon entrance into the destination domain, wherein the original TE-LSP attribute is provided at the source domain, and wherein the interdomain TE-LSP is an end-to-end tunnel configured to guarantee a predetermined level of quality of service and traverse one or more intermediate domains that are configured to translate original TE-LSP attributes into intermediate domain TE-LSP attributes, translate the original TE-LSP attribute into an intermediate domain TE-LSP attribute using a translation map, and in response to the request, perform one of:

storing the original TE-LSP attribute in an object of the request, or storing the intermediate domain TE-LSP attribute in the object of the request.

27. An exit border router of an intermediate domain, the exit border router comprising:

one or more network interfaces;

a processor coupled to the one or more network interfaces and adapted to execute software processes; and a memory adapted to store a process executable by the processor, the process configured to:

receive a request requesting (i) an interdomain Traffic Engineering Label Switched Path (TE-LSP) between a source domain and a destination domain, the request having an intermediate domain TE-LSP attribute for the interdomain TE-LSP, wherein the intermediate domain TE-LSP attribute has been translated, using a translation map, from an original TE-LSP attribute provided by the source domain, and (ii) restoration of the original TE-LSP attribute upon entrance into the destination domain, wherein the interdomain TE-LSP is an end-to-end tunnel configured to guarantee a predetermined level of quality of service and traverse one or more intermediate domains that are configured to translate original TE-LSP attributes into intermediate domain TE-LSP attributes, restore the intermediate domain TE-LSP attribute into the original TE-LSP attribute in response to the request, remove an object from the request, the object comprising one of the original TE-LSP attribute or the intermediate domain TE-LSP attribute, and forward the request to the destination domain.

28. The head-end node as in claim 25, wherein the request comprises a resource reservation protocol signaling message.

29. The entry border router as in claim 26, wherein the process is further configured to:

replace the original TE-LSP attribute in the request with the intermediate domain TE-LSP attribute when the original TE-LSP attribute is stored in the object of the request.

30. The entry border router as in claim 29, wherein the process is further configured to:

store each of one or more original TE-LSP attributes in a separate sub-object of the object.

31. The entry border router as in claim 26, wherein the process is configured to:

maintain the original TE-LSP attribute in the request when the intermediate domain TE-LSP attribute is stored in the object of the request.

32. The exit border router as in claim 27, wherein the process is further configured to:

include a flag in the request indicating that the restoration was completed.

* * * * *